US 6,666,673 B2

(12) United States Patent
Johns et al.

(10) Patent No.: US 6,666,673 B2
(45) Date of Patent: *Dec. 23, 2003

(54) SIDE MOUNTED TEMPERATURE PROBES FOR PRESSWARE DIE SETS

(75) Inventors: Albert D. Johns, Saylorsburg, PA (US); Mircea T. Sofronie, Easton, PA (US); Mark B. Littlejohn, Appleton, WI (US)

(73) Assignee: Fort James Corporation, Deerfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/428,673

(22) Filed: May 2, 2003

(65) Prior Publication Data

US 2003/0198703 A1 Oct. 23, 2003

Related U.S. Application Data

(63) Continuation of application No. 09/653,572, filed on Aug. 31, 2000, now Pat. No. 6,585,506.
(60) Provisional application No. 60/153,096, filed on Sep. 9, 1999.

(51) Int. Cl.[7] .............................................. B29C 43/58
(52) U.S. Cl. ............... 425/170; 425/394; 425/DIG. 127
(58) Field of Search .................................. 425/170, 394, 425/143, 144, 145, DIG. 127

(56) References Cited

U.S. PATENT DOCUMENTS

| 3,999,917 A | * 12/1976 | Knowles ...................... 425/145 |
| 4,435,143 A | 3/1984 | Dempsey ...................... 425/150 |
| 4,609,140 A | 9/1986 | Van Handel et al. .... 229/2.5 R |
| 4,721,500 A | 1/1988 | Van Handel et al. ........ 493/153 |
| 4,755,128 A | 7/1988 | Alexander .................... 425/292 |
| 4,778,439 A | 10/1988 | Alexander .................... 493/169 |
| 4,832,676 A | 5/1989 | Johns et al. ................. 493/152 |
| 5,041,071 A | 8/1991 | Reasinger et al. .......... 493/167 |
| 5,249,946 A | 10/1993 | Marx .......................... 425/142 |
| 5,261,806 A | * 11/1993 | Pleasant ...................... 425/144 |
| 5,731,537 A | * 3/1998 | Sassaman .................... 264/296 |
| 5,866,175 A | * 2/1999 | Latham ........................ 425/170 |
| 6,070,437 A | * 6/2000 | Sanik et al. ................. 425/144 |

* cited by examiner

*Primary Examiner*—Robert Davis
*Assistant Examiner*—Thu Khanh T. Nguyen
(74) *Attorney, Agent, or Firm*—Michael W. Ferrell

(57) ABSTRACT

In a temperature controlled segmented die for forming pressed containers such as plates, trays, bowls or the like including a die segment with a forming surface and an outer movable annular die member there is provided a side mounted temperature probe which extends laterally around the movable annular die member and toward the forming surface of the die segment. The apparatus is particularly useful for forming pressed paperboard containers such as paper plates.

21 Claims, 4 Drawing Sheets

SIDE MOUNTED TEMPERATURE PROBES FOR PRESSWARE DIE SETS

CROSS-REFERENCE TO RELATED APPLICATIONS

This patent application is a continuation patent application of U.S. Ser. No. 09/653,572, filed Aug. 31, 2000, now U.S. Pat. No. 6,585,506, which application was based on U.S. Provisional Application Ser. No. 60/153,096, filed Sep. 9, 1999. The priorities of the foregoing applications are hereby claimed.

TECHNICAL FIELD

The present invention relates to the temperature-controlled die sets for forming food serving disposable pressware containers, such as plates, bowls, trays and the like, and more particularly to a temperature controlled die set utilizing a side mounted, flexible temperature probe which is angled toward the forming surface of a die segment. The apparatus of the present invention is particularly useful for forming plates and the like from paperboard blanks, where temperature control near the forming surfaces is particularly important.

BACKGROUND

Pressed containers, such as pressed paperboard containers including plates, trays, bowls and the like are well known in the art. Typically, such articles are manufactured on an inclined die set having upper and lower halves. Illustrative in this regard is U.S. Pat. No. 5,249,946 to Marx assigned to the assignee of the present invention. Referring to the '946 patent, a typical product is manufactured by way of feeding a continuous paperboard web into a cyclically operating blanking section. The forming section includes a plurality of reciprocating upper die halves opposing, in facing relationship, a plurality of lower die halves. The upper die halves are mounted for reciprocating movement in a direction that is oblique or inclined with respect to the vertical plane. The blanks, after cutting, are gravity fed to the inclined lower die halves in the forming section.

Particular forming dies and processes for making pressed paperboard products are likewise well known. Most typically, dies sets for forming paperboard containers include a male or punch die half and a female die half. Typically, the punch half is reciprocally mounted with respect to its opposing die half and both die halves are segmented. One or more portions of the die halves may be spring-biased if so desired, and the particular geometry of the die will depend upon the product desired. In this regard, there is shown in U.S. Pat. No. 4,832,676 to Johns et al. an apparatus for forming a compartmented paperboard plate. The dies illustrated in the '676 patent includes spring-biased segments as well as pressure rings on the punch half and draw rings about the opposing plate. The particular apparatus further includes an articulated, full area knock-out.

Forming operations can be somewhat critical in order to produce quality product at the desired rates. In this respect U.S. Pat. No. 4,721,500 to Van Handle et al. is informative. Note also U.S. Pat. No. 4,609,140 to Van Handle et al. The '140 patent provides a general description of one known forming method as will be appreciated from FIG. 3 thereof. FIG. 3 shows a cross section of the upper die half and lower die half which are utilized to press a flat, circular paperboard blank into the shape of the plate. The construction of the die halves and the equipment on which they are mounted is substantially conventional; for example, as utilized on presses manufactured by the Peerless Manufacturing Company. To facilitate the holding and shaping of the blank, the die halves are segmented in the manner shown. The lower die has a circular base portion and a central circular platform which is mounted to be moveable with respect to the base. The platform is cam operated in a conventional manner and urged toward a normal position such that it's flat top forming surface is initially above the forming surface of the base. The platform is mounted for sliding movement to the base, with the entire base itself being mounted in a conventional manner on springs. Because the blank is very tightly pressed at the peripheral rim area, moisture in the paperboard which is driven therefrom during pressing and the heated dies cannot readily escape. To allow the release of this moisture, at least one circular groove is provided in the surface of the base which vents to the atmosphere through a passageway. Similarly, the top die half is segmented into an outer ring portion, a base portion and a central platform having a flat forming surface. The base portion has curved, symmetrical forming surfaces and the outer ring has curved forming surfaces. The central platform in the outer ring are slidingly mounted to the base and biased by springs to their normal position shown in FIG. 3 in a commercially conventional manner. The top die half is mounted to reciprocate toward and away from the lower die half. In the pressing operation, the blank is first laid upon the flat forming surface, generally underling the bottom wall portion of the plate to be formed, and the forming surface makes first contact with the top of the blank to hold the blank in place as the forming operation begins. Further downward movement of the top die half brings the spring-biased forming surfaces of the outer ring into contact with the edges of the blank to begin to shape the edges of the blank over the underlying surfaces in the areas which will define the overturned rim of the finished plate. However, because the ring is spring-biased the paperboard material in the rim area is not substantially compressed or distorted by the initial shaping since the force applied by the forming surfaces is generally light and limited to the spring force applied to the ring. Eventually, the top die half moves sufficiently far down so that the platform segments and the ring are fully compressed such that the adjacent portions of the forming surfaces are coplanar. In a conventional manner the die halves are heated with electrical resistance heaters and the temperature of the die halves is controlled to a selected level by monitoring the temperature of the dies with thermistors mounted in the dies as close as possible to the for surfaces.

For paperboard plates stock of conventional thicknesses ie. in the range of from about 0.010 to about 0.040 inches, the spacing between the upper die surface and the lower die surface decline continuously from the nominal paperboard thickness at the center to a lower value at the rim.

The springs upon which the lower die half is mounted are typically constructed such that the full stroke of the upper die results in a force applied between the dies of from about 6000 to 8000 pounds.

The paperboard which is formed into the blanks is conventionally produced by a wet laid paper making process and is typically available in the form of a continuous web on a roll. The paperboard stock is preferred to have a basis weight in the range of from about 100 pounds to about 400 pounds per 3000 square foot ream and a thickness or caliper in the range of from about 0.010 to about 0.040 inches as noted above. Lower basis weights and caliper paperboard is preferred for ease of forming and for saving feedstock costs. Paperboard stock utilized for forming paper plates is typically formed from bleached pulp furnish, and is usually double clay coated on one side. Such paperboard stock commonly has a moisture (water content) varying from about 4.0 to about 8.0 percent by weight.

The effect of the compressive forces at the rim is greatest when the proper moisture conditions are maintained within the paperboard: at least 8% and less than 12% water by weight, and preferably 9.5 to 10.5%. Paperboard in this range has sufficient moisture to deform under pressure, but not such excessive moisture that water vapor interferes with the forming operation or that the paperboard is too weak to withstand the high compressive forces applied. To achieve the desired moisture levels within the paperboard stock as it comes off the roll, the paperboard is treated by spraying or rolling on a moistening solution, primarily water, although other components such as lubricants may be added. The moisture content may be monitored with a hand held capacitive type moisture meter to verify that the desired moisture conditions are being maintained. It is preferred that the plate stock not be formed for at least six hours after moistening to allow the moisture within the paperboard to reach equilibrium.

Because of the intended end use of the paper plates, the paperboard stock is typically coated on one side with a liquid proof layer or layers. In addition, for esthetic reasons, the paper plate stock is often initially printed before being coated. As an example of typical coating material, a first layer of polyvinyl acetate emulsion may be applied over the printed paperboard with a second layer of nitrocellulose lacquer applied over the first layer. The plate stock is moistened on the uncoated side after all of the printing and coating steps have been completed. In a typical forming operation, the web of paperboard stock is fed continuously from a roll through a cutting die to form the circular blanks which are then fed into position between the upper and lower die halves. The dies halves are heated as described above, to aid in the forming process. It has been found that best results are obtained if the upper die half and lower die half—particularly the surfaces thereof—are maintained at a temperature in the range of from about 250° F. to about 320° F., and most preferably at about 300° F.±10° F. These die temperatures have been found to facilitate the plastic deformation of paperboard in the rim areas if the paperboard has the preferred moisture levels. At these preferred die temperatures, the amount of heat applied to the blank is apparently sufficient to liberate the moisture within the blank under the rim and thereby facilitate the deformation of the fibers without overheating the blank and causing blisters from liberation of steam or scorching the blank material. It is apparent that the amount of heat applied to the paperboard will vary with the amount of time that the dies dwell in a position pressing the paperboard together. The preferred die temperatures are based on the usual dwell times encountered for normal production speeds of 40 to 60 pressings a minute, and commensurately higher or lower temperatures in the dies would generally be required for higher or lower production speeds, respectively.

As will be appreciated by one of skill in the art, the knock-outs are important for holding the container blank on center during formation and for separating the finished product from the die halves, particularly during high speed operation. The mechanical features can be further augmented pneumatically as is disclosed in U.S. Pat. No. 4,755,128 to Alexander et al. Other patents of interest include: U.S. Pat. No. 4,435,143 to Dempsey; U.S. Pat. No. 5,041,071 to Reasinger et al.; and U.S. Pat. No. 4,778,439 to Alexander.

A temperature sensor such as a thermocouple, thermistor, or a resistive temperature device ("RTD") can be inserted externally, that is from outside of the die set periphery straight into the die or punch half forming base to give a relative temperature measurement. This sensing method does not provide a realistic measurement of the forming surface temperature since the sensor is typically several inches away. Wider swings in actual forming surface temperatures can exist with such an externally mounted temperature sensor due to the time lag resulting from the distances between the heating element, the forming surface, and the sensors. A peripherally mounted temperature sensor can be easily installed or replaced if the die set is hot and mounted in a forming press, but provides relatively poor forming surface temperature control and consistency. Thus formed, pressware products will have larger deviations in formation, heat pressing and corresponding strengths/rigidity. While a peripherally mounted temperature probe is a low cost simple method, it is not preferred due to the lack of control and consistency.

Another method which is commonly used involves internally inserting a temperature probe into a segmented die directly above the forming surface in an axial position above the area desired to be measured. A temperature sensor such as a thermocouple, thermistor or RTD can be inserted axially (internally from within the die set towards the die or punch die surface) to provide improved temperature control and consistency. The temperature sensor typically is inserted internally to avoid interference with the moving components of the die set including, for example, a pressure and draw ring. Formed pressware products will have more consistent formation, pleat pressing and corresponding strength/rigidity. However, the sensor must be installed or replaced when the die half is out of the forming press. This is a safety concern when the heavy die set is hot it must be handled/lifted out of and into the press. Excessive machine down time is experienced using this internal or axially mounted method. Up to twelve thermocouples in total can be used in a typical forming press to provide independent temperature control for all of the plurality of die and punch halves. The chance of a thermocouple failure are thus substantially increased. All the forming lanes of the press must be shut down to replace one failed internally mounted thermocouple resulting in significant machine down time, loss of production and non-productive man hours. Product cost increases and product quality decreases if a failed thermocouple is not replaced immediately.

SUMMARY OF INVENTION

This invention relates to the application of a side mounted temperature sensor such as thermocouples, thermistors, RTD, and the like in matched metal pressware die sets for the conversion of food service disposable articles such as plates, bowls, trays, and platters to improve ease of installation and replacement upon failure of the temperature sensors. The side mounted temperature sensors are easier to install and replace upon failure and result in less machine downtime and less non-productive man hours, thus increasing forming productivity (product output) and reducing product cost while maintaining a consistent, quality pressed product.

Accurate temperature measurement is essential in the production of consistent quality pressed paperboard products such as plates, bowls, oval platters and trays. The moistened paperboard is cut into blanks (which may be scored) and formed between two heated matched metal forming die halves (die and punch) which are closed under pressure for a given dwell period; typically on the order of 1 second or less. The paperboard container in the blank is folded into pleats during the forming and is dried to conform to the shape of the die set. The combination of moisture, heat and pressure is necessary to obtain the final product shape and to press the paperboard pleats. Final product strength/rigidity is determined from this process.

The temperature measurement sensor should ideally be as close as possible to the forming surface that contacts the paperboard and presses the paperboard pleats to maintain consistency and control. The temperature measurement sensors must be inserted in a manner such that they do not interfere with the moving die set components such as the draw ring, and pressure ring, and so forth, that are necessary to control paperboard gathering and plate formation.

The temperature measurement sensors typically connect to a controller that turns on and off power to heating components (ring, tubular, cast heaters, and so forth) which are internally located in the die set halves. The controller will heat or cool the die set towards the desired process set point based on the input from the corresponding temperature measurement sensors. One temperature measurement sensor and one controller is typically necessary for each die and punch half across the forming press. A forming press may contain up to six die and punch combinations, thus requiring a total of twelve temperature sensors and twelve controllers.

Temperature probes are available in a wide variety of styles, sizes, lengths, wire diameters, wire coverings, and so forth. The sensor styles would include thermocouples of type J, K, T, E, R & S wire combinations that have two dissimilar metals in intimate contact to develop a voltage which depends on the temperature of the junction and the particular metals used. The following Table correlates ANSI codes with the material combinations for thermocouples:

| ANSI Code | Materials and Polarities | |
| --- | --- | --- |
|  | Positive | Negative |
| T | Cu | Constantan |
| E | Ni—Cr | Constantan |
| J | Fe | Constantan |
| K | Ni—Cr | Ni—Al |
| R | Pt-13% Rh | Pt |
| S | Pt-10% Rh | Pt |

A resistive temperature device or "RTD" may include a wire-wound ceramic element, wound with a purity-controlled platinum wire and are generally available from sensor suppliers such as Watlow Gordon of Illinois. So also thermistors and RTD's, which are electrical conductors that experience a change in resistance with temperature, may be employed if so desired.

The preferred side mounted temperature probes used in accordance with the present invention are a J style (iron/constantan) sheath grounded junction thermocouple with a spring loaded bayonet style fitting such as described hereinafter. Particularly preferred temperature probes may be obtained from Watlow Gordon of Richmond, Ill., USA under a part no. 10 DJSGBO 43A which defines a construction code, 10=VAT (variable adjustable thermocouple) with 6 inch spring, sheath diameter (inches D=$3/16$ inch), calibration J=type J (iron/constantan), lead protection S=fiberglass with stainless steel over braid (24 gauge stranded), junction G=grounded, round tip, sheath length (inches B=1), lead length=43 inches, termination/options A=standard, 2½ inch split leads. A multiplicity of variations on the preferred type of probe are possible for the side mount thermocouple within the spirt and scope of the present invention.

In accordance with the invention, a temperature sensor such as a thermocouple or thermistors can be inserted externally, that is, from the sidewall outside of the die set without interfering with any moving die set components such as the pressure or draw ring and bent around a corner towards the die or punch forming surface to provide improved temperature control and consistency. The die set is especially designed to allow space for the temperature sensors to be inserted without any interference. This may involve increasing the overall die set height. In a preferred embodiment, a removable machined housing component is mounted on to the die or punch base to ease the cornering of the thermocouple during insertion or removal. This housing is mounted with two socket head cap screws that can be easily and safely removed from a hot die set. Clearance holes are machined through and into the die base so that the preferred thermocouple and spring overwrap can be easily inserted without interference. The rounded tip is ideally the only part of the thermocouple probe which touches the die set near the forming surface. The bayonet fitting must be adjusted/turned such as to provide spring compression upon mounting to ensure that the tip is biased into contact with the die set metal near the forming surface. This method is preferred since it provides accurate and consistent temperature control for the pressware process without the necessity to remove the die set to install or replace temperature sensors. The side mounted temperature sensors can be replaced in a hot die set safely in minutes without removing the die set, resulting in less machine down time, lower cost production and minimal product cost impact. The side mounted temperature sensor technique is easily implemented as would be appreciated from the detailed description hereinafter.

Described more generally, there is provided by way of the present invention in a temperature controlled, segmented die for forming press containers such as plates, trays, bowls, and the like, mounted about an axis of reciprocation and being provided with an outer annular die member and a die segment with a forming surface, the outer die member being moveable along the axis of reciprocation with respect to the die segment and the forming surface along a stroke length proximate to the forming surface there is additionally provided a flexible temperature probe having a sensor tip inserted laterally into a sidewall of the segmented die, outside of the stroke length of the annular member. The flexible temperature probe extends laterally into the segmented die and is angled to extend toward the forming surface such that the sensor tip is within from about ½ to about $1/32$ inch of the forming surface of the die segment. Typically the sensor tip is within from about $1/16$ to about ¼ inch of the forming surface; within about ⅛ inch of the forming surface being preferred.

In general the temperature probe can include a thermocouple such as an iron/constantan thermocouple, a thermistor or RTD. The temperature probe preferably includes means for biasing the temperature sensor tip toward the forming surface such as a spring which is most preferably affixed to a retaining member or to the sidewall of the segmented die.

There is thus provided in another aspect of the present invention a temperature controlled segmented die half for forming press containers such as plates, bowls, trays and the like mounted about an axis of reciprocation and including: (a) a die segment defining a forming surface; (b) means for heating said die segment; (c) an outer annular die assembly moveably mounted along the axis of reciprocation with respect to the die segment and forming surface along a stroke length proximate to the forming surface; (d) a flexible temperature probe with a sensor tip; (e) a temperature controller coupled to said means for heating said base plate and said flexible temperature probe; and (f) means for securing said flexible temperature probe to the segmented die such that the flexible temperature probe is inserted laterally into the sidewall of the segmented die outside of the stroke length of the outer annular die member and the flexible temperature probe is angled to extend toward the forming surface of the die segment such that the sensor tip is within from about 1/32 to about 1/4 inch from the forming surface of the die segment.

Typically the sensor tip of the flexible temperature probe is within from about 1/16 to about 1/4 inch of the forming surface; within about 1/8 inch of the forming surface of the base plate being preferred. In a most preferred embodiment a spring annularly surrounds the flexible temperature probe and is connected to a retaining member in a form of a slotted cap affixed to both the spring of the flexible temperature probe and wherein the slotted cap is lockingly engaged to a pair of pins mounted on the temperature controlled segmented die, that is a typical bayonet fitting as noted above.

In still yet another aspect of the invention there is provided a method of forming a pressed container from a container blank comprising: (a) measuring the temperature with a temperature sensor in a segmented die maintained about an axis of reciprocation, the die being provided with an annular outer member and a die segment with a forming surface, the outer annular die member being moveable along the axis of reciprocation with respect to the base plate and forming surface along a stroke length proximate to the forming surface, the temperature sensor being disposed on the tip of a flexible temperature probe, inserted laterally in a sidewall of the segmented die outside of the stroke length of the outer annular die member, the flexible temperature probe extending laterally into the segmented die and being angled to extend toward the forming surface such that the sensor is within about from 1/2 to about 1/32 inch from the forming surface of the die segment; (b) in response to the measurement of said temperature sensor, controlling temperature of the die segment; and (c) forming the container by contacting the forming surface with the container blank. The container blank may be paperboard, plastic, paperboard/ plastic composites and so forth such as are for disposable food serving containers. Most preferably the container blank is a paperboard container blank having a thickness from about 0.008 to about 0.050 inches. Typically the paperboard container blank has a moisture content of from about 8 to about 12% by weight; with from about 8.5 to about 10.5% being particularly preferred. In general it is desirable to maintain the temperature of the forming surface of the segmented die between about 250° F. and 320° F. when forming a paperboard blank; between about 290° F. and 310° F. being particularly preferred.

BRIEF DESCRIPTION OF THE DRAWINGS

The invention is described in detail below with reference to the various figures, wherein like numerals designate similar parts and wherein.

DETAILED DESCRIPTION

The invention is described in detail below with reference to the various figures which illustrate specific embodiments of the present invention. Such description and exemplification is for purposes of illustration only and in no way limits the spirit and scope of the present invention which is set forth in the appended claims. Inasmuch as the present invention is an improvement to existing pressware die sets and such apparati, the invention will be described with reference to the differences between the present invention and existing equipment. In this regard, the following United States Patents are illustrative of the state of the art and known systems:

U.S. Pat. No. 5,249,946;

U.S. Pat. No. 4,832,676;

U.S. Pat. No. 4,721,500;

U.S. Pat. No. 4,609,140;

the disclosures of which are hereby incorporated into this description in their entirety by reference.

Referring now to FIGS. 1 through 5 the invention will now be described with reference to particular embodiments thereof.

Figure 1:
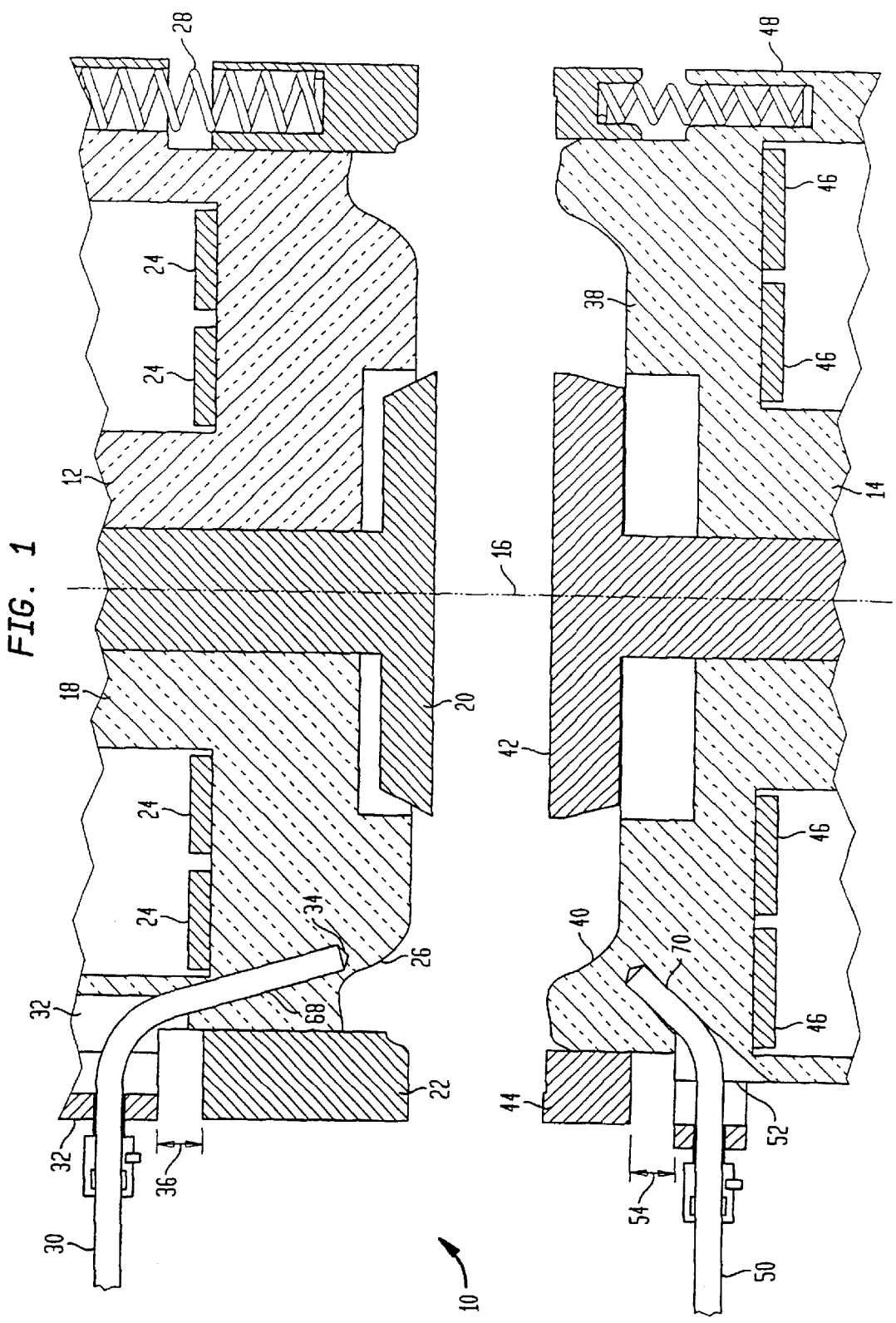
FIG. 1 is a schematic diagram illustrating the temperature probe of the present invention inserted to the upper and lower halves of a segmented die set in an open position.
Figure 2:
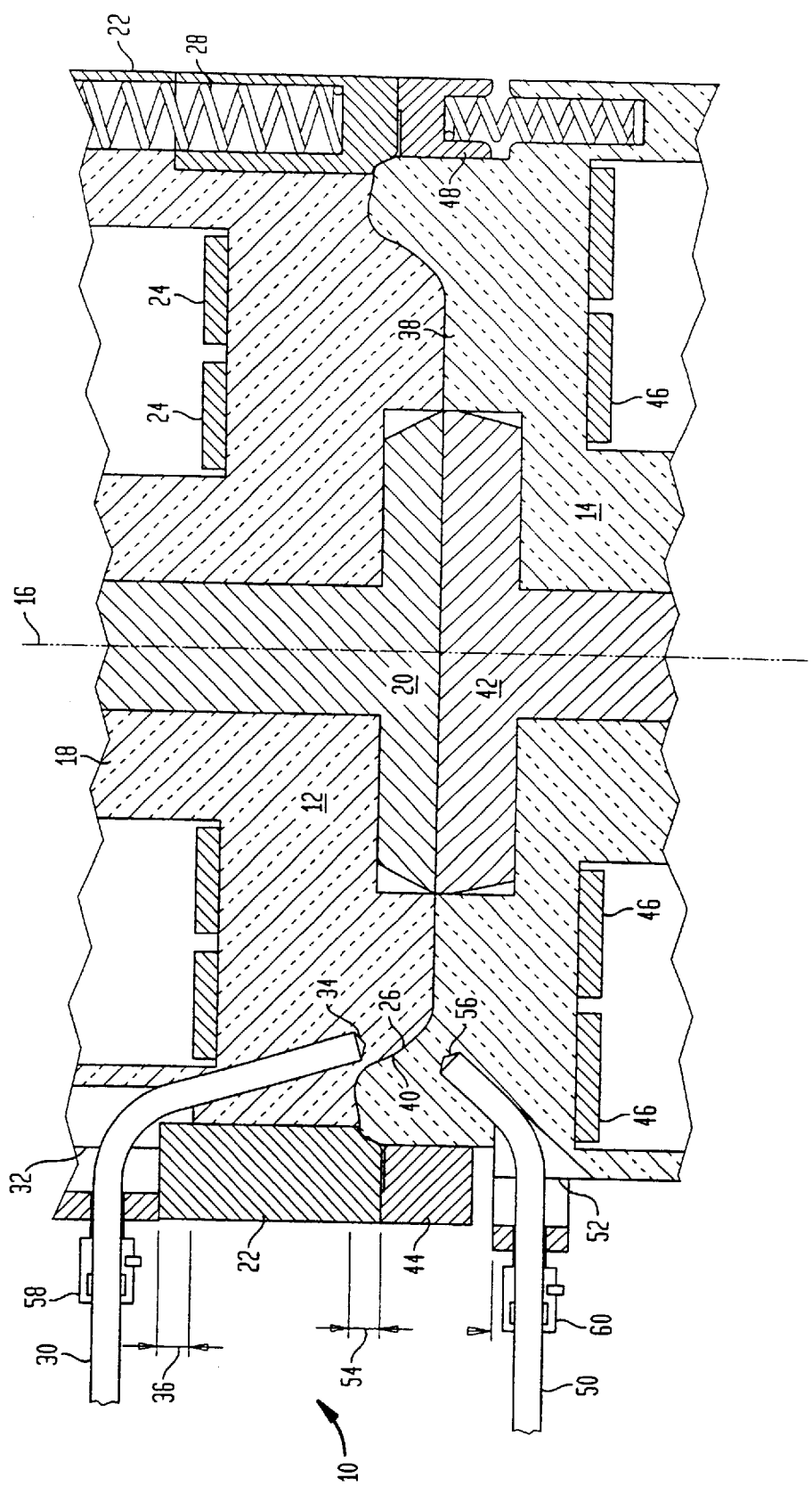
FIG. 2 is a schematic diagram of the segmented die set of FIG. 1 in a closed position illustrating the inventive temperature probe apparatus.

There is shown in FIGS. 1 and 2 a metal pressware die set 10 which includes an upper die half (sometimes referred to in the art as the punch) 12 and a lower die half (sometimes referred to in the art as the die) 14. Both halves 12, 14 are segmented pressware dies as will be appreciated from the discussion which follows. Die half 12 and die half 14 are mounted about an axis of reciprocation 16 in facing relationship as shown. Die half 12 comprises generally of an upper base plate 18 provided with a knock-out 20. There is additionally provided an annular pressure ring 22 as well as heating coils 24. Base plate 18 is provided with forming surfaces such as surface 26 which is used to form the sidewall of a paperboard pressware product. It is at such surfaces that temperature control is particularly important as will be appreciated by one of skill in the art. There may also be provided a plurality of springs, such as spring 28 can be used to bias the various parts. Typically, between 4 and 8 springs are used to individually bias the various parts. Likewise, knock-out 20 may be spring biased if so desired. It can be appreciated by one skilled in the art that the various parts of the segmented die such as pressure ring 22 and knock-out 20 are capable of movement independently of the other parts of the segmented die such as plate 18. Pressure ring 22 makes it particularly difficult to measure directly the temperature at surface 26 of base plate 18 unless one utilized an internal temperature probe system such as that known in the prior art as described hereinabove. In accordance with the invention, there is provided an angled flexible temperature probe 30 that extends from the sidewall in a transverse direction as shown, that is, transverse being substantially perpendicular to the axis of reciprocation about which the die is mounted and is angled towards forming surface 26 so that the tip 34 of the temperature probe upon which the temperature sensor is located, is in proximity to surface 26. As will be appreciated hereinafter, pressure ring 22 reciprocates about a stroke length indicated at 36, such that it is not possible to have a straight probe mounted on the die half 12 approach surface 26 in close proximity.

On the lower half of FIG. 1 there is shown the lower half (die) of a pressware die set which comprises a base plate 38 having a forming surface 40 as well as a knock-out 42 and a draw ring shown at 44. It is additionally provided with heating coils in 46 and a plurality of springs, such as spring 48 which may be used to bias the particular desired segment of the die half if so desired. Typically, between 4 and 8 springs are used to individually bias the various parts. In accordance with the present invention there is provided an angled, flexible probe 50 extending from the sidewall 52 of the die half toward forming surface 40 of base plate 38. Here again ,due to the fact that draw ring 44 moves over a stroke length 54, it is not possible for a straight temperature probe to come into close proximity of forming surface 40 without interfering with the operation of the segmented die. Thus, in accordance with the present invention there is provided an angled flexible temperature probe which can be in close proximity, i.e., 1/32 to 1/2 of an inch of the forming surface without the need to go through the top or bottom surface of the die half which typically needs to be mounted on a press so that it is not readily accessible during use as noted above.

Figure 3A:
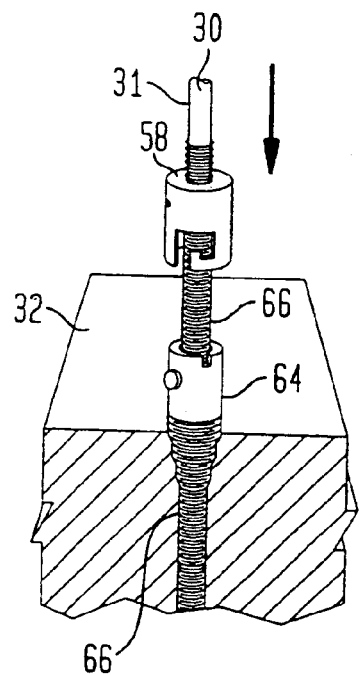
FIGS. 3(a) and 3(b) are details showing a particularly preferred method of connecting a flexible temperature probe in accordance with the present invention.
Figure 3B:
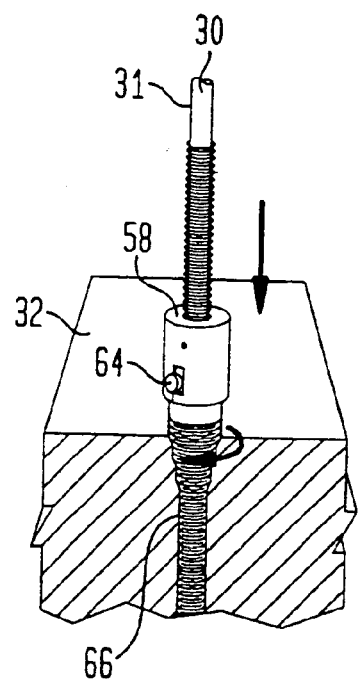

FIG. 2 is a diagram showing the die set of FIG. 1 as it would appear during the forming step, that is, upon application of pressure to a paperboard blank, for example, where it can be seen that the outer annular rings such as pressure ring 22, and draw ring 44 (outer rings which are annular in nature) move from their rest position along the stroke lengths at 54 and 36. It can be seen that the temperature probes 30 and 50 are transversely mounted on the sidewall of the die outside of the stroke length of both the rings 22 and 44 respectively. It should also be appreciated that it is best to use a probe with a sensor tip such as tip 34 and a tip 56 such that the actual temperature sensor is close to the area desired to be monitored for temperature. Likewise, it is desirable to see that the tip having the sensor is urged into contact with the surface of the base plate as close as possible to a critical forming surface such as surfaces 26, 40 during use. The particularly preferred system for use in connection with the present invention is a spring loaded bayonet type of mounting system wherein spring loaded caps such as caps 58 and 60 are used to position the flexible temperature probes as is better appreciated as shown in FIGS. 3a and 3b. There is shown in FIG. 3a a slotted cap 58 as lockingly engageable about a bayonet fitting 64 which is affixed to a sidewall such as sidewall 32 of die half 12. The cap is preferably affixed to a spring 66 as well as the temperature probe 30 and wire 31 such that the tip of the probe can be urged against the surface of a channel such as channels 68, 70 in FIGS. 1 and 2 in order to accurately measure temperature at the desired location.

Figure 4:
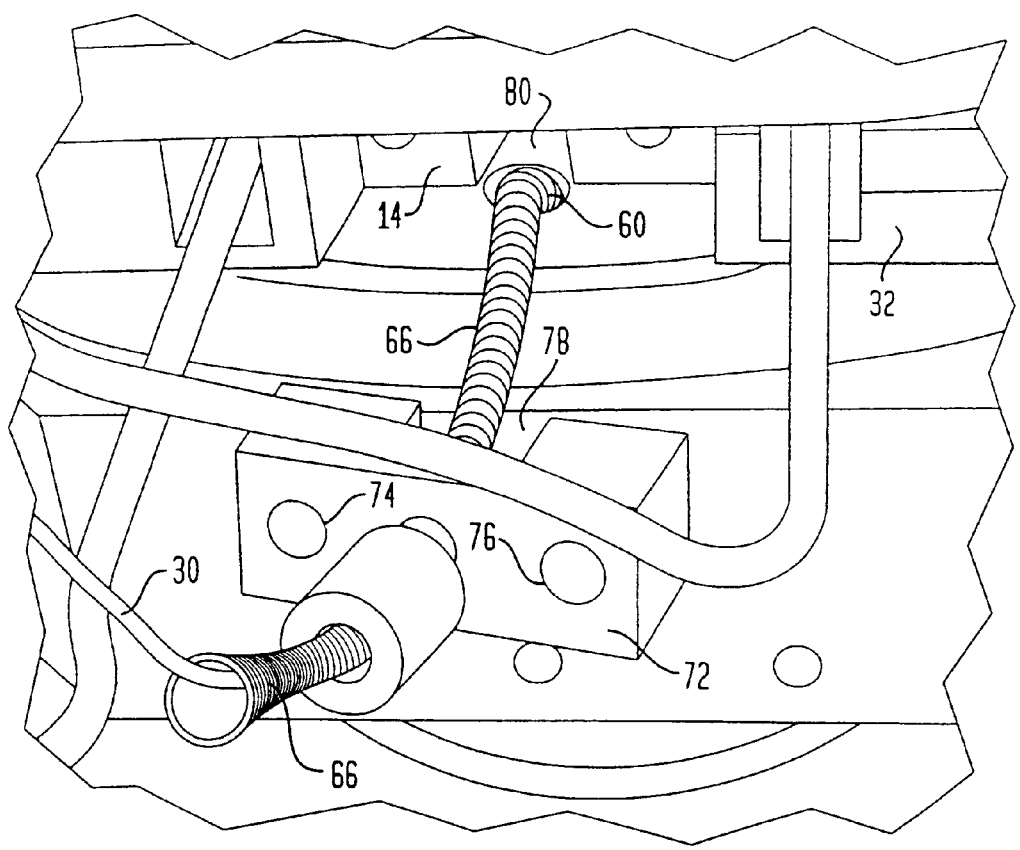
FIG. 4 is a detail illustrating a particularly preferred mode of providing a mounting cavity and channel for the flexible temperature probe of the present invention.

It is particularly preferred to utilize a removable plate defining a cavity to install the inventive probe on a segmented die as will be described in connection with FIG. 4. FIG. 4 shows the sidewall such as sidewall 32 of a segmented die of the upper half of a segmented die set sometimes referred to as the punch half. There is provided in a particularly preferred embodiment of the present invention a C-shaped retaining member 72 provided with bolt holes 74, 76 for bolting member 72 to sidewall 32 as well as a central cavity 78 through which the probe 30 along with a portion of spring 66 may pass. This way channel 68 is readily available to an operator or technician wishing to thread probe 30 down into the base plate of die half 12. It should be noted that a matching cavity 80 in the sidewall of the die half is provided so that the channel 60 may be readily fabricated by conventional techniques.

Figure 5:
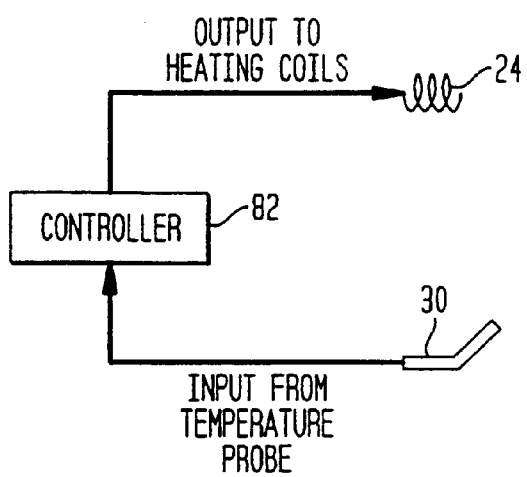
FIG. 5 is a block diagram illustrating the connections between a temperature controller, the inventive temperature probes, and the heating coils located in the die segments of the die halves illustrated in FIGS. 1 and 2. The controller circuitry may also include the necessary relays, switches, fuses and the like typically used for such a heating application.

Turning finally to FIG. 5 it will be appreciated in accordance with the invention that the temperature is monitored and the temperature forming surfaces is controlled by conventional techniques. For example, the input from a probe such as from probe 30, is provided to a controller such as controller 82 which compares the signal with a predetermined value and will provide electrical power as appropriate to heating coils such as heating coils 24 in order to maintain the desired temperature at the forming surface.

What is claimed is:

1. In a temperature controlled, segmented die for forming pressed containers mounted about an axis of reciprocation and being provided with an outer annular die member and a die segment with a forming surface, said outer annular die member being moveable along said axis of reciprocation with respect to said die segment and forming surface along a stroke length proximate to said forming surface; a side-inserted flexible temperature probe provided with a sensor tip inserted laterally into a side of said segmented die, outside of said stroke length of said annular die member, said flexible temperature probe extending laterally into said segmented die in a first direction over a portion of its length and being angled toward said forming surface in a second direction over a portion of its length such that an inflection in the probe internal to the segmented die is defined between the first and second directions and wherein said sensor extends toward said forming surface of said die segment along the second direction such that the tip is in proximity to the forming surface.

2. The angled flexible temperature probe according to claim 1, wherein said sensor tip is within from about 1/16 to about 1/4 inch of said forming surface of said base plate.

3. The angled flexible temperature probe according to claim 2, wherein said sensor tip is within about 1/8 inch of said forming surface of said base plate.

4. The angled flexible temperature probe according to claim 1, wherein said temperature probe comprises a thermocouple.

5. The angled flexible temperature probe according to claim 4, wherein said thermocouple is an iron/constantan thermocouple.

6. The angled flexible temperature probe according to claim 1, wherein said temperature probe comprises a thermistor.

7. The angled flexible temperature probe according to claim 1, wherein said temperature probe comprises a resistive temperature device.

8. The angled flexible temperature probe according to claim 1, wherein said probe comprises means for biasing said temperature sensor tip toward said forming surface.

9. The angled flexible temperature probe according to claim 8, wherein said means for biasing said temperature sensor tip of said probe towards said forming surface comprises a spring.

10. The angled flexible temperature probe according to claim 9, wherein said spring is affixed to a retaining member removably secured to the sidewall of said segmented die.

11. A temperature controlled segmented die for forming pressed containers mounted about an axis of reciprocation comprising:

(a) a die segment defining a forming surface;

(b) means for heating said die segment;

(c) an outer annular die member movably mounted along said axis of reciprocation with respect to said die segment and forming surface along a stroke length proximate to said forming surface;

(d) a flexible temperature probe with a sensor tip;

(e) a temperature controller coupled to said means for heating said base plate and said flexible temperature probe; and (f) means for securing said flexible temperature probe to said segmented die such that said flexible temperature probe is inserted laterally into the side of said segmented die outside of said stroke length of said outer annular die member and extends laterally inwardly over a portion of its length in a first direction and said flexible temperature probe is angled toward said forming surface of said base plate in a second direction over a portion of its length such that an inflection in the probe internal to the segmented die is defined between the first and second directions and wherein said sensor extends toward said forming surface of said die segment along the second direction such that the tip is in proximity to the forming surface.

12. The temperature controlled segmented die according to claim 11, wherein said sensor tip is within from about 1/16 to about 1/4 inch of said forming surface of said base plate.

13. The temperature controlled segmented die according to claim 12, wherein said sensor tip is within about 1/8 inch of said forming surface of said base plate.

14. The temperature controlled segmented die according to claim 11, wherein said temperature probe comprises a thermocouple.

15. The temperature controlled segmented die according to claim 14, wherein said thermocouple is an iron/constantan thermocouple.

16. The temperature controlled segmented die according to claim 11, wherein said temperature probe comprises a thermistor.

17. The temperature controlled segmented die according to claim 11, wherein said temperature probe comprises a resistive temperature device.

18. The temperature controlled segmented die according to claim 11, wherein said probe comprises means for biasing said temperature sensor tip towards said forming surface.

19. The temperature controlled segmented die according to claim 18, wherein said means for biasing said temperature sensor tip of said probe towards said forming surface comprises a spring.

20. The temperature controlled segmented die according to claim 19, wherein said spring is affixed to a retaining member removably secured to said sidewall of said segmented die.

21. The temperature controlled segmented die according to claim 20, wherein said spring annularly surrounds said flexible temperature probe and said retaining member comprises a slotted cap affixed to both said spring and said flexible temperature probe and wherein said slotted cap is lockingly engaged to a pair of pins mounted on said temperature controlled segmented die.

* * * * *

UNITED STATES PATENT AND TRADEMARK OFFICE
CERTIFICATE OF CORRECTION

PATENT NO. : 6,666,673 B2
DATED : December 23, 2003
INVENTOR(S) : Albert D. Johns et al.

It is certified that error appears in the above-identified patent and that said Letters Patent is hereby corrected as shown below:

<u>Column 2,</u>
Line 8, change "it's" to -- its --;
Line 28, change "underling" to -- underlying --;
Line 47, change "for" to -- forming --;
Line 49, insert -- , -- after "thicknesses";
Line 50, change "ie." to -- i.e., --;

Signed and Sealed this

Twenty-second Day of June, 2004

JON W. DUDAS
*Acting Director of the United States Patent and Trademark Office*